United States Patent [19]

McMillan et al.

[11] 4,342,647

[45] Aug. 3, 1982

[54] TREATMENT OF SCRAP

[75] Inventors: Fraser McMillan, Prahran; Graeme J. Guthrie, North Rocks; David J. Williams, Northbridge, all of Australia

[73] Assignee: The Commonwealth Industrial Gases Limited, Surry Hills, Australia

[21] Appl. No.: 224,576

[22] PCT Filed: May 29, 1980

[86] PCT No.: PCT/AU80/00017

§ 371 Date: Nov. 26, 1980

§ 102(e) Date: Nov. 26, 1980

[87] PCT Pub. No.: WO80/02672

PCT Pub. Date: Dec. 11, 1980

[30] Foreign Application Priority Data

May 29, 2979 [AU] Australia .............................. PD8991

[51] Int. Cl.³ .............................................. B03C 1/30
[52] U.S. Cl. .......................................... 209/3; 209/11; 209/39; 209/40; 241/17; 241/23; 241/24; 241/DIG. 31; 241/DIG. 37
[58] Field of Search ................... 209/3, 11, 12, 39, 40; 241/14, 17, 19, 23, 24, DIG. 31, DIG. 37, 65, 47, 49; 62/63, 374, 381

[56] References Cited

U.S. PATENT DOCUMENTS

| | | | |
|---|---|---|---|
| 2,471,043 | 5/1949 | Schenck | 241/23 X |
| 2,919,862 | 1/1960 | Beike et al. | 241/65 X |
| 3,718,284 | 2/1973 | Richardson | 241/23 |
| 3,890,220 | 6/1975 | Anderson | 241/19 X |
| 3,992,899 | 11/1976 | Spahn | 241/DIG. 37 X |

FOREIGN PATENT DOCUMENTS

| | | | |
|---|---|---|---|
| 147186 | 10/1936 | Austria | 241/49 |
| 772918 | 3/1972 | Belgium | 241/DIG. 37 |
| 409874 | 2/1925 | Fed. Rep. of Germany | 241/49 |
| 1027964 | 4/1958 | Fed. Rep. of Germany | 241/47 |
| 1128265 | 4/1962 | Fed. Rep. of Germany | 241/47 |

OTHER PUBLICATIONS

Grant, J., Ed., Hackh's Chemical Dictionary, McGraw-Hill Book Co., New York, N.Y., 4th Ed., 1972, p. 272.

*Primary Examiner*—Ralph J. Hill
*Attorney, Agent, or Firm*—Beveridge, DeGrandi and Kline

[57] ABSTRACT

Uncured rubber scrap may be segregated from metal and fiber contaminants by the method of first embrittling the scrap by immersion in a liquid cryogen, then impacting the embrittled rubber and magnetically removing metal, and then milling the remainder. Gas flotation is used during milling so that particles of rubber and fiber are selectively removed from the mill and subsequently classified by size, whereby most of the fibrous component is segregated from a remainder. The remainder is then worked so as to increase the surface area of residual fiber prior to further segregation of fiber from rubber by gas flotation. The combined milling and flotation procedure may also be used for separating components of other mixtures. Apparatus for embrittling and milling is described.

14 Claims, 10 Drawing Figures

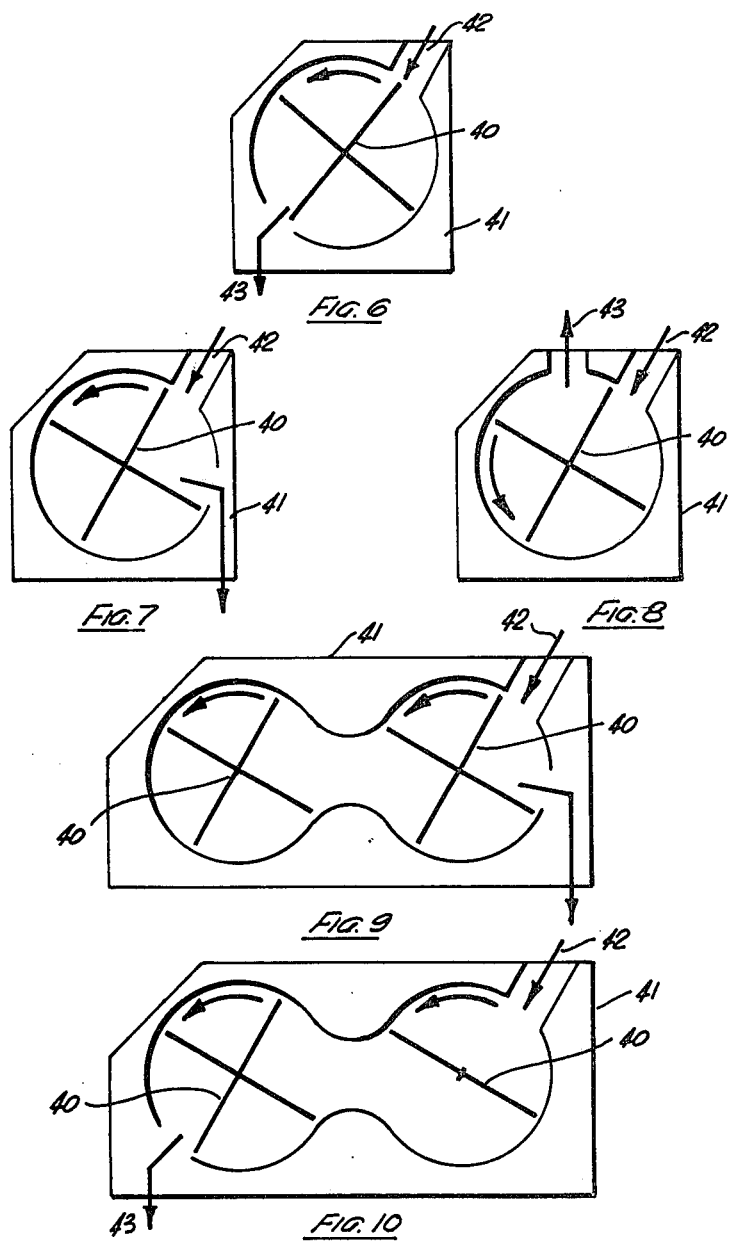

TREATMENT OF SCRAP

TECHNICAL FIELD

This invention relates to a method and apparatus for size reduction of a material which is frangible when frozen and for separation of such material from contaminants.

The process and apparatus of the invention are particularly suitable for use in the recovery of scrap rubber, and more particularly to the recovery of uncured rubber process scrap.

BACKGROUND ART

Many rubber articles are provided during manufacture with reinforcements. During manufacture the reinforcing material or materials are emplaced in the article prior to curing the rubber to form the finished article. The term "rubber" as herein used includes both natural rubber and synthetics used as rubber substitutes. The term "uncured rubber" refers to rubber which has not been vulcanised but which may include a minor proportion of reclaimed vulcanised or devulcanised rubber which is sometimes incorporated by blending with new uncured rubber. Examples of rubber articles of the type under discussion are tyres and hoses which may be reinforced with steel, woven fabrics, fibres and the like or by a combination of such reinforcements.

In the manufacture of rubber articles, for any of a number of reasons, the article may be scrapped after incorporation of reinforcing materials but prior to vulcanisation. In the case for example of tyre manufacture, there then results a scrap comprising uncured rubber, contaminated with steel, woven fabric and "cured lumps." The scrap is extremely tacky and agglomerates on contact with other like scrap. It is difficult to handle and hitherto has been disposed of by dumping. Not only the uncured rubber but also the metal and fibrous reinforcements would have considerable commercial value if satisfactorily separable one from each other.

Processes are known for the embrittlement of vulcanised articles such as tyres by use of a cryogenic medium to render the rubber frangible followed by impacting to render the frangible rubber into small pieces. In such processes metal is usually recovered from the impacted rubber by magnetic separation. A limited proportion of the fabric contaminated product can be blended with new rubber the majority being fed instead to chemical plants for chemical removal of fibre and for devulcanisation of the rubber.

In one proposed embrittlement process tyres are dipped in a bath of liquid nitrogen. By virtue of the slow rate of progress through baths required to achieve embrittlement, that process requires a large investment of capital in dip-baths and is wasteful of cryogen. More commonly, cooling tunnels divided into a pre-cooling zone and a liquid nitrogen spraying zone have been employed. The tyres are pre-cooled while being conveyed on belts from the feed-point through the pre-cooling zone towards the spraying zone by means of cryogen boiled off in the spraying zone. U.S. Pat. No. 3,992,899 describes a method of embrittling old tyres which avoids some of the disadvantages of the above methods by pre-cooling the tyres in a rotary tunnel inclined downwardly from the feed end and delivering the tyres to a spraying and draining zone. The apparatus provides a high "feed ratio" at the feed end and a long, convoluted pathway for cooling gases from the cryogen at the spraying zone in order to ensure maximum heat transfer and pre-cooling of the feed material. Neither of the foregoing methods provide for segregation of the rubber from fibrous contaminants.

U.K. Pat. No. 1,334,718 describes a process in which fabric and metal contaminants are segregated from vulcanised rubber articles. In that process the vulcanised articles are first embrittled by conventional means. The embrittled vulcanised articles are then disunited from the vulcanised rubber component by flexing, crushing or comminuting the embrittled material. The fabric component is then removed by screening, for preference but not essentially, under cryogenic conditions.

Alternatively, according to the latter patent, the article may be torn to pieces in a cracker mill prior to embrittlement. In that event the embrittled material contains fibre as well as fabric pieces. The embrittled material is then further comminuted prior to segregation and the fibre subsequently removed cyclonically or by screening.

Uncured rubber has chemical and physical properties quite distinct from that of vulcanised rubber. None of the above described processes has been used to reclaim scrap uncured contaminated rubber which has continued to be dumped despite the high commercial incentive for its reclamation.

Uncured rubber is by nature extremely sticky and irretrievably agglomerates on contact with other portions of uncured rubber. Because of those properties uncured rubber cannot be handled in conventional cooling tunnels or through conventional cryogenic baths. Unlike articles of vulcanised rubber such as tyres which have a substantial uniformity of size, scrap arisings of uncured rubber vary drastically in size and for this reason are unsuitable for feeding into apparatus such as has been discussed above. Furthermore because of its extreme stickyness and agglomerative properties, it cannot be pre-comminuted or otherwise reduced to a uniform size suitable for infeed to feeding tunnels or pre-cooling tunnels. In addition unlike embrittled vulcanised rubber, embrittled scrap cannot be allowed to thaw, even locally, at any intermediate process stage since it will then re-agglomerate.

The product from the process of U.K. Pat. No. 1,334,718 is vulcanised rubber which may be blended in limited proportion with new rubber or which is subsequently devulcanised or depolymerised by chemical processes as reclaim. Accordingly a degree of fibre contamination in the product can be tolerated for most purposes. In the recovery of scrap uncured rubber it is desirable that the scrap rubber be obtained substantially free of fibre contamination for direct re-use as new unvulcanised rubber or for blending in any proportion with new unvulcanised rubber and without any further chemical treatment.

That desired degree of freedom from fibre contamination cannot be economically achieved by any of the methods disclosed in U.K. Pat. No. 1,334,718. Even when the problem of embrittling the uncured rubber is solved, the mere screening of impacted contaminated material as taught in that patent is ineffective to efficiently and sufficiently remove fibrous contamination. On the other hand comminution followed by cyclonic separation to remove fibres cannot be conducted efficiently at the low temperatures required to prevent re-agglomeration of the uncured rubber.

The present invention provides a method and apparatus which avoids the above discussed disadvantages of the prior art. While it is especially suitable for use in reclaiming uncured rubber it also has application for reclamation of cured rubber and more generally for separating from each other other materials which are frangible when frozen.

DISCLOSURE OF THE INVENTION

According to a first aspect the invention consists in a method for segregating a first component from a mixture of the first component with a second component when particles of each component have appreciably different fluidization characteristics comprising the steps of:
A. reducing the particle size of at least one component of the mixture;
B. continuously during said reducing removing particles from said mixture by fluidization in a gas stream having a predetermined velocity whereby there are removed particles of said first component and particles of the second component having a size different from each other; and
C. classifying by size said removed particles.

According to a second aspect the invention consists in a method for segregating uncured rubber from a contaminant selected from the class consisting of fabrics, fibres and filaments, comprising the steps of:
A. embrittling the rubber by cryogenic cooling;
B. reducing the particle size at least of the embrittled rubber;
C. continuously during said reducing removing particles from said mixture by fluidization in a gas stream of a predetermined velocity whereby to remove particles of rubber and of contaminant having a size different from each other;
D. classifying by size said particles removed; and
E. maintaining said embrittled uncured rubber from the first step in an embrittled condition until after the fourth step.

According to a third aspect the invention consists in a method further comprising the step of packing uncured rubber after segregation from the contaminant prior to allowing it to thaw.

According to a fourth aspect the invention consists in apparatus comprising:
a drum having charge means at or adjacent to one end and discharge means at or adjacent the other end, said drum being adapted to contain a quantity of a liquid cryogen;
screw means for conveying a material charged from said charge means to said discharge means and for at least partly immersing said material in said liquid cryogen; and
means whereby liquid cryogen conveyed with said material may be returned from adjacent said discharge means towards said charge means.

These and other aspects of the invention are discussed hereinafter with reference to examples.

BRIEF DESCRIPTION OF THE DRAWINGS

By way of example various embodiments of the invention will now be described with reference to the accompanying schematic drawings in which:

FIGS. 6 to 10 show diagrammatically various arrangements of a mill of use in the process shown in FIG. 1.

BEST MODE OF CARRYING OUT THE INVENTION

Figure 1:
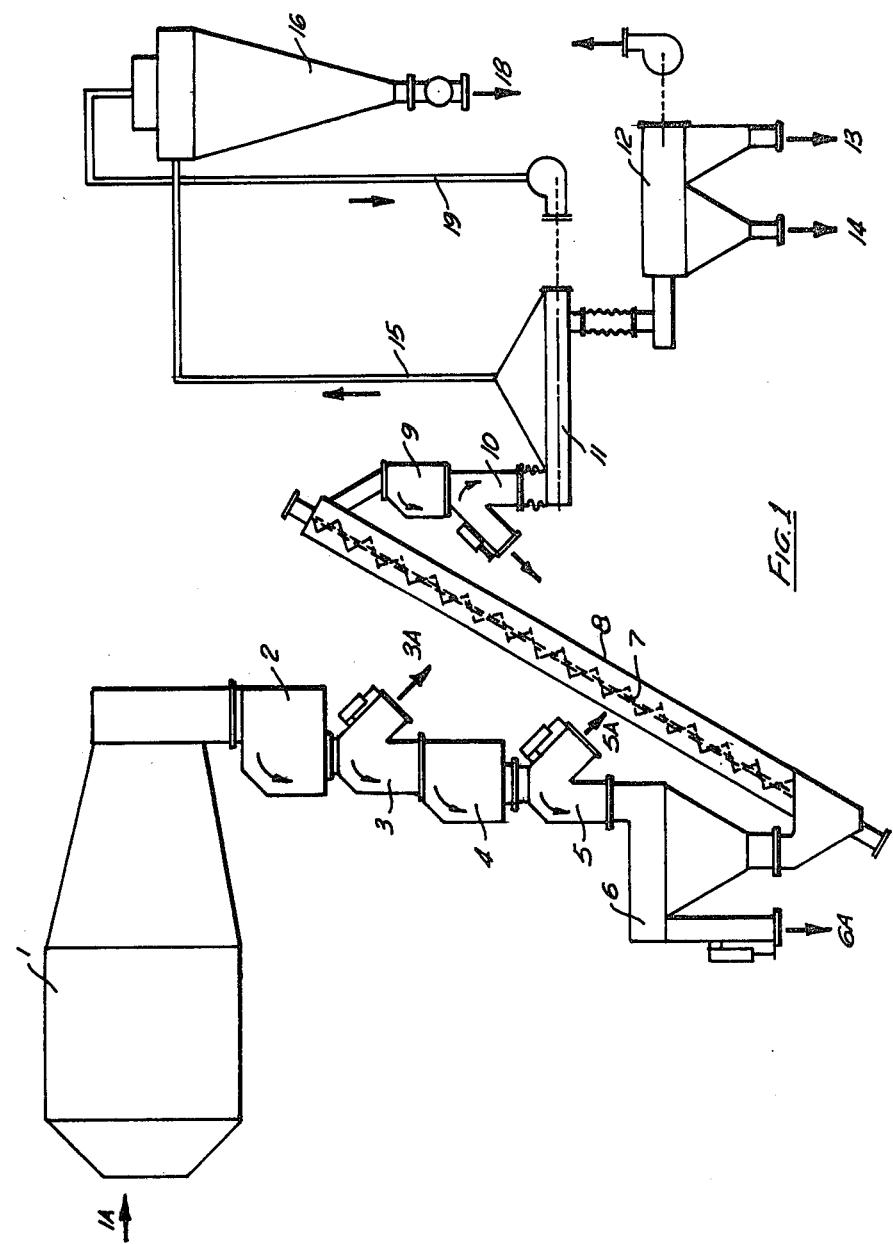
FIG. 1 is a schematic drawing of a scrap rubber recovery plant according to the invention.

A process for treating scrap uncured rubber will now be described with reference to FIG. 1. The scrap of the example contains metal strands, woven fabric and "cured lumps." The scrap is first fed at 1A to a cryogenic immersion tunnel 1 to be described in more detail hereinafter. The tunnel contains a suitable liquid cryogen, for example liquid nitrogen, and the scrap is conveyed through the tunnel while substantially immersed in the liquid nitrogen. The rapid reduction in temperature of the feed material which has not been subjected to prior breaking or cooling, eliminates the major problem which is encountered in attempting to reduce the sticky, hard to handle, feed at ambient temperature.

The product which is discharged from immersion tunnel 1 is embrittled and is fed to a cryogenic impact mill 2. Impact mill 2 is of a design similar to conventional impact mills such as are used for crushing stone but is adapted to enable its use at low temperature, that is to say at temperatures of from −70° C. to −196° C. Mill 2 differs from conventional mills of that type in that it is not fitted with a screen, and in that it has large clearances between hammers and strikers. The use of a cryogenic impact mill enables large sections of embrittled material to be reduced in size and provides an even flow conducive to effective subsequent grinding. The apparatus is not used in the present process merely for size reduction but also for exposing and partially disengaging steel or other ferrous metal contaminants. The use of an impact mill at low temperature to break up a compound feed in which a component, in this case rubber compound, has been embrittled, has the advantage in the present process that it frees rubber compound from steel mesh without any risk of the steel becoming entangled in the device. Moreover use of an impact mill such as described has the advantage of creating a greater differential in average particle size between the rubber and steel components than may be obtained using a conventional hammer mill and with less risk of localised heating and consequently possible thawing of the rubber.

The output from the cryogenic impact mill 2 is fed to a magnetic separator 3 employing a conventional rotary magnet but adapted for low temperature operation. The majority of the steel can be immediately removed at 3A from the remainder of material by the rotary magnet and typically 70%–90% by weight of steel present may be removed in this operation.

The remainder is fed to a cryogenic primary grinder 4 which is used to assist to complete the separation of rubber compound from metal and to carry out separation of rubber from fabric. The primary grinder 4 comprises a hammer mill, which will be described in more detail hereinafter, and which has no screen but is provided with an aperture at which suction may be applied. The effect of hammer milling is that the specific surface area of the embrittled rubber compound is greatly increased in comparison with that of the fabric and as the fabric is less dense than the rubber, the application of an appropriate degree of suction will selectively remove relatively finely ground rubber accompanied by long strands of fabric substantially free of rubber compound, but not linted to a significant extent. In the present example the suction is controlled to maintain a flow of cold nitrogen gas sufficient to remove from the mill by fluidization rubber particles of up to approximately 15 mm maximum dimension, together with fibres of up to 500 mm or more in length.

Milling proceeds with a more or less continuous feed to the mill and with continuous selective removal by the nitrogen gas flow of size reduced rubber and of fibres.

While other forms of mill could be used, the primary grinder described reduces the average particle size of the rubber compound to a much greater degree than that of the fabric and metal contaminants. Because of the difference in density between the fibres and rubber, the nitrogen flow removes a mixture in which the size distribution of components is optimally different and which permits subsequent simple separation of the majority of fabric by screening.

The material removed by suction from the primary grinder 4 is preferably passed through a second magnetic separator 5 similar to magnetic separator 3 to remove at 5A further steel freed during milling before passing the remainder to a trommel screen 6 which removes at 6A most of the fabric, the rubber particles passing through.

The apparatus for conducting the steps so far described may conveniently be arranged at different levels so that the product from one operation may be gravity fed to the next operation in the sequence. If necessary to reduce overall height of the plant, the rubber products passing through the trommel screen 6 may conveniently be elevated at this stage, for example using a screw-feeder 7 housed in a nitrogen gas duct 8, for delivery to the next apparatus a cryogenic fine grinding mill 9.

Fine grinding mill 9 is of a conventional type but also adapted for low temperature operation and achieves two distinctly separate objectives simultaneously:

(a) the reduction of the rubber compound to the required size specification—a conventional cryogenic grinding operation, (b) the severe "working" of any residual fibre resulting in a significant increase in specific surface area of the fibre by the generation of a lint-like material.

The remaining material may then be passed through a further magnetic separator 10 and then to an air jig 11, a conventional apparatus adapted for cryogenic use, used to fluidize the linted fibre free from the rubber compound. In the present process available cold nitrogen gas rather than air is used in the jig to provide cooling and maintain the free-flowing nature of the frozen uncured rubber compound.

The fibre floated from airjig 11 is passed at 15 to a cyclone 16 where it is separated from the nitrogen stream, the fibre being recovered at 18 and the nitrogen being recycled at 19.

The remainder from the air jig may be passed through another trommel screen 12 through which uncured rubber substantially free from steel and woven fabric passes for bagging, oversize rubber being returned at 13 to the cryogenic fine grinding mill 9.

The product is fed at 14 to a carousel bagging device whereby it is continuously fed into storage bags mounted on a carousel which indexes automatically when a sensing device establishes that any given bag is filled to the required level. By avoiding need for a hopper this procedure also avoids agglomeration of the product as it thaws.

The feed material is maintained at a low temperature and in an embrittled state from the first step until the last, all separation steps being conducted at low temperature. It is desirable that cold gas obtained from the liquid cryogen in tunnel 1 be used to maintain low temperature in subsequent steps.

It will be noted that the process then operates on a basis contrary to conventional cryogenic processes in that the feed material is not pre-cooled by cold gas from the expendable cryogen. Rather the material is rapidly cooled by immersion in the cryogen in the first step and cold nitrogen is used to maintain the low temperature attained during subsequent operations. This overcomes the problem of handling sticky feed and prevents agglomeration.

Previous separation processes used means adapted for use at low temperature only to the extend of changes to materials of mill construction but otherwise conventional for impacting embrittled rubber. In the present process the use of an impact mill not fitted with a screen and having large clearances to expose the metal aids the immediate removal thereafter of approximately 70%–90% of the metal by rotary magnets and greatly simplifies subsequent process operations. For example tangled steel wire has a tendency to ball up and would make processing difficult if not removed at an early stage. Moreover the early removal of steel wire greatly reduces the possibility of its entanglement in items of rotating machinery in later stages of the process which could cause localised heat build-up and potentially could cause localised "thawing" of uncured rubber compound with attendant problems.

The use of a cryogenic grinding mill has been found to reduce the rubber compound to a much greater degree than the fabric and metal contaminants; the selective reduction in size of one component contributes to this separation.

Moreover removal from the mill by fluidization of particles having selected fluidization characteristics provides a size distribution of components which is optimally different and also contributes to the separation.

The present method is in contrast to earlier processes wherein particles are comminuted to a preselected size range and are subsequently separated cyclonically, that is to say by weight, or by screening.

Similarly the use of a cryogenic fine grinding mill not only achieves size reduction but contributes to the separation. The severe working of the residual fibre results in a significant increase in surface area and generation of a lint-like material which is separable by use of an air jig. Since the quantity of fibre in the material subjected to fine grinding is typically less than 1%, the amount of heat generated is not significant. It is worth noting in addition the following.

In stage one of the separation the rubber is selectively reduced increasing surface area per unit mass. In the second stage of separation of a mixture of the same components, albeit now in different proportions, the other component the fibre is relatively reduced creating a "lint" with very high surface area per unit mass.

This again contrasts with earlier processes in which size is used as a basis for classifying lint from rubber.

Figure 2:
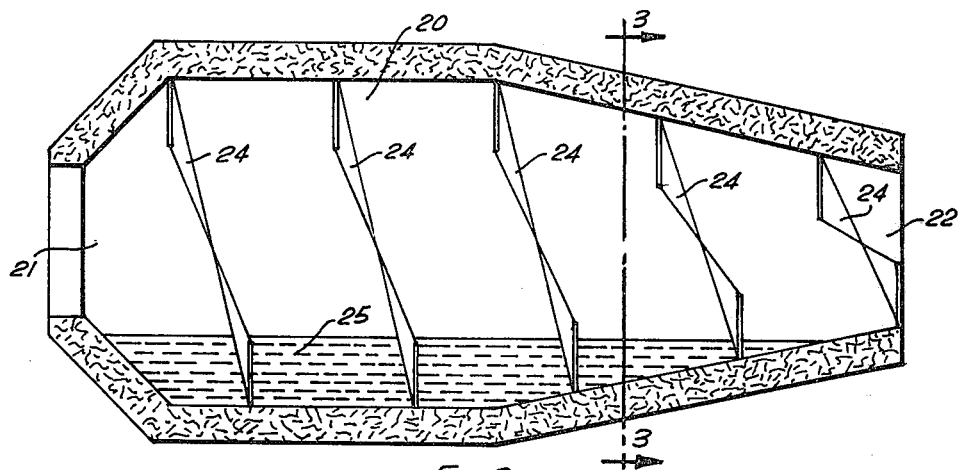
FIG. 2 shows, in elevation, a first embodiment of a cryogenic immersion tunnel, of use in the process shown in FIG. 1.
Figures 3, 5:
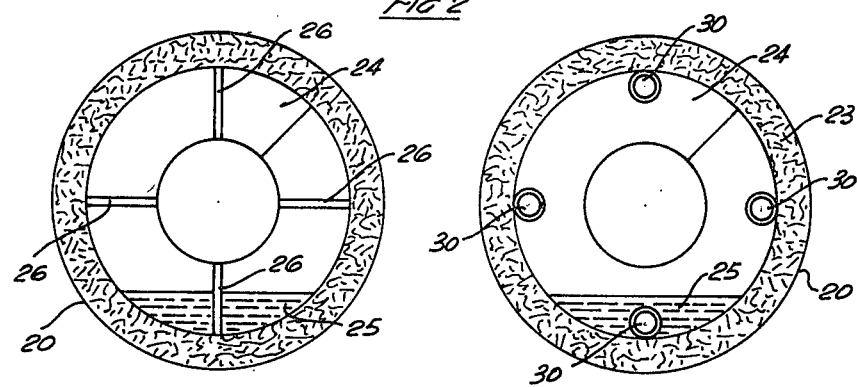
FIG. 3 shows a section taken on line A—A of FIG. 2.
FIG. 5 shows a section taken on line A—A of FIG. 4.

With reference to FIGS. 2 and 3 there is shown an embodiment of a cryogenic immersion apparatus for use in the process shown in FIG. 1. The tunnel comprises a drum 20 which is mounted for axial rotation by means not shown in FIG. 1 and which is adapted to contain a quantity of a liquid cryogen while rotating. Drum 20 has charge means 21 comprising a charge opening at one end and discharge means 22 comprising an opening at the other end. Desirably drum 20 is "bellied" and for preference has a centre section which is substantially cylindrical, and end sections which are frusto-conical in shape as shown in FIG. 2. Preferably also the axis of rotation of drum 20 is inclined to the horizontal at an angle of between 0 degrees and 30 degrees, the discharge opening 22 being at the elevated end.

Drum 20 may be cylindrical in shape over its entire length if suitable lower end wall means and inclination of axis are provided in order to contain the cryogen.

Drive means, not shown in FIG. 1, are provided for rotating the drum in axial rotation. Drum 20 has thermal insulation 23 appropriate to the liquid cryogen to be contained. Drum 20 is fitted internally with a helix 24 mounted to the drum wall which conveys product fed into the drum at the charge opening 21 to the discharge opening 22 when the drum is rotated. In operation drum 1 contains a liquid cryogen 25, preferably liquid nitrogen, which is maintained substantially at a level by virtue of perforations 26 at or near the outer circumference of helix 24. The perforations may be holes but are preferably slots and more preferably radial slots which permit the liquid nitrogen to drain towards the charge end while conveying the product through the drum. Radial slots are preferred to drilled holes as they prevent feed contaminants, and particularly wire reinforcement contaminants, from becoming ensnared in the tunnel.

Figure 4:
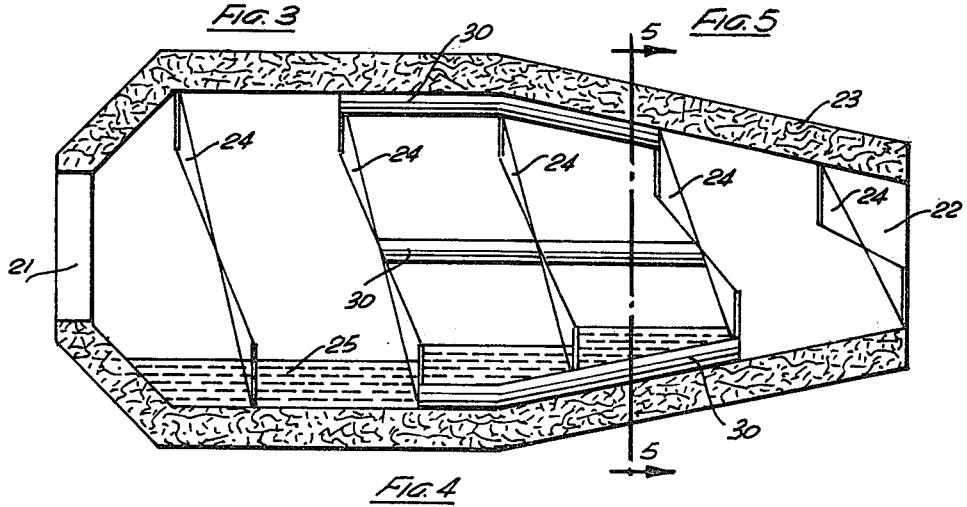
FIG. 4 shows a second embodiment of a cryogenic immersion tunnel of use in the process shown in FIG. 1.

A second embodiment of a rotary immersion tunnel is shown in FIGS. 4 and 5 and the same numerals have been used to identify parts in FIGS. 4 and 5 as were used to identify corresponding parts in FIGS. 2 and 3. In the embodiment of FIGS. 4 and 5 drum 20 is upwardly inclined towards the discharge end, and mounted for rotation, and is provided internally with a helix 24 similar to an Archimedian screw. Helix 24 thus conveys product from the charge opening 21 to the discharge opening 22 during rotation of drum 20.

Draining means, in this example, comprise one or a plurality of pipes 30 arranged to return liquid nitrogen that has been conveyed with the product towards the discharge opening from adjacent to the discharge opening 22 towards the charge end of drum 20.

According to a third embodiment not illustrated in the accompanying drawings, conveyor means are provided whereby material may be conveyed from outside the drum to inside the drum while isolating the atmosphere inside the drum from the external atmosphere and substantially eliminating ingress of air and moisture. For example a belt conveyor carrying semi-circular flights at spaced apart intervals along the belt length may be adapted to carry material into opening 21, the succession of flights effectively maintaining a seal with the insulated surrounding defining opening 21.

As will be apparent to those skilled in the art one or more features of one of the embodiments of the cryogenic immersion tunnel may be combined with those of others. Moreover, less desirably, the drum may be stationary and may have a driven rotating Archimedian screw 24 mounted independently of the wall of drum 20. Also the number of liquid nitrogen return pipes 30 may be one or more and they may be arranged internal to the inner wall of drum 10 or indeed, with suitable insulation external to drum insulation 23.

The apparatus eliminates the major problem of handling feed which is sticky and hard to handle at ambient temperature by rapidly cooling it in the first handling operation of the process and thereby preventing agglomeration. It is significant that in the present apparatus the infeed material is fed from ambient temperature directly into contact with the liquid cryogen. This provides maximum cooling rate of thick bulky sections of feed which have not been subjected to prior size reduction. An important advantage of the embodiment shown in FIGS. 3 and 4 is that product being conveyed up the incline towards the discharge opening may be maintained submerged in liquid cryogen right up to the moment of discharge from the drum with substantially no liquid carryover. A further advantage in comparison with the first embodiment is that much less liquid nitrogen must be held within the drum to submerge a given quantity of product for a given length of time. FIGS. 6 to 10 illustrate schematically various alternative embodiments of the cryogenic grinding mill to which reference has previously been made. In each of the drawings, the numeral 40 indicates a hammer mill rotor driven in axial rotation in the direction indicated within housing 41 which has a product feed inlet 42 and an outlet 43. Suction is applied adjacent outlet opening 43 by means not shown in the drawings. Housing 41 is thermally insulated. The mill is not fitted with a screen.

INDUSTRIAL APPLICABILITY

Although the process described has particular advantage in the case of sticky feed materials such as uncured rubber it will be appreciated that the process is also applicable to vulcanised rubber scrap recovery and may be adapted for the removal of contaminants other than those described therefrom. The process may also be adapted by means which will be apparent to those skilled in the art, for handling feed materials which become embrittled at low temperatures other than cured or uncured rubber, for example for separating paper from confectionery or one confectionery component from another.

What is claimed is:

1. A method for segregating uncured rubber from a contaminant selected from the class consisting of fabrics, fibres and filaments, comprising the steps of:
   A. embrittling the rubber by cryogenic cooling;
   B. reducing the particle size at least of the embrittled rubber;
   C. continuously during said reducing removing particles from said mixture by fluidization in a gas stream of a predetermined velocity whereby to remove particles of rubber and of contaminant having a size different from each other;
   D. classifying by size said particles removed; and
   E. maintaining said embrittled uncured rubber from the first step in an embrittled condition until after the fourth step.

2. A method according to claim 1, wherein said step of classifying is conducted so as to segregate particles of the contaminant from a remainder comprising particles of contaminant and particles of uncured rubber.

3. The method according to claim 2 further comprising the steps of:

F. working said remainder whereby the specific surface area of particles of the contaminant is increased relative to the specific surface area of particles of the uncured rubber;

G. subsequently classifying said particles by fluidization in a gas stream; and

H. maintaining said embrittled uncured rubber from said first step in an embrittled condition until after step G.

4. A method according to claim 2 wherein at least one of steps C and D is conducted while the rubber is embrittled.

5. A method according to any one of claims 1 to 3 wherein said step of embrittling comprises rapidly cooling said rubber by at least partial immersion in a liquid cryogen.

6. A method according to claim 5 further comprising the step of impacting said embrittled uncured rubber so as to increase the surface area thereof and at least partial to disunite said rubber from said contaminant prior to step B.

7. A method according to claim 5 when dependent on claim 1 wherein cryogenic gas boiled from said liquid cryogen is used to produce the gas stream for step C.

8. A method according to claim 5 when dependent on claim 3 wherein cryogenic gas boiled from said liquid cryogen is used to provide the gas stream of step G.

9. A method according to claim 5 when dependent on claim 1 wherein cryogenic gas boiled from said liquid cryogen is used to maintain said uncured rubber in an embrittled condition during steps B, C and D.

10. A method according to any one of claims 1 to 3 further comprising the step of packing uncured rubber after segregation from the contaminant prior to allowing it to thaw.

11. A method for segregating from uncured rubber a contaminant selected from the class consisting of fabrics, fibres and filaments comprising the steps of:

A. embrittling said rubber by cryogenic cooling;

B. disuniting the embrittled rubber from the contaminant;

C. reducing the particle size of at least the rubber;

D. continuously during said reducing removing particles from said mixture by fluidization in a gas stream of a predetermined velocity whereby to remove particles of rubber and of contaminant having a size different from each other; and E. classifying by size said particles removed.

12. The method according to claim 4 or 11 wherein step E is conducted so as to segregate particles of the contaminant from a remainder comprising particles of contaminant and particles of rubber.

13. The method according to claim 12 further comprising the steps of working said remainder whereby the specific surface area of particles of the contaminant is increased relative to the specific surface area of particles of the uncured rubber and subsequently classifying said particles by fluidization in a gas stream.

14. The method of claim 13 when conducted while said rubber is cryogenically embrittled.

* * * * *